(12) United States Patent
Stollwerck et al.

(10) Patent No.: US 8,722,778 B2
(45) Date of Patent: May 13, 2014

(54) UV PROTECTIVE COMPOSITIONS, PROCESSES FOR PREPARING SUCH COMPOSITIONS, METHODS OF COATING SUBSTRATES THEREWITH AND MULTI-LAYER ARTICLES FORMED THEREBY

(75) Inventors: Gunther Stollwerck, Krefeld (DE); Robert Maleika, Düsseldorf (DE); Frank Buckel, Krefeld (DE); Peter Capellen, Krefeld (DE)

(73) Assignee: Bayer MaterialScience AG (DE)

( * ) Notice: Subject to any disclaimer, the term of this patent is extended or adjusted under 35 U.S.C. 154(b) by 661 days.

(21) Appl. No.: 12/254,387

(22) Filed: Oct. 20, 2008

(65) Prior Publication Data

US 2009/0130489 A1 May 21, 2009

(30) Foreign Application Priority Data

Oct. 20, 2007 (DE) .......................... 10 2007 050 192

(51) Int. Cl.
*C08K 5/3492* (2006.01)
*C09D 5/00* (2006.01)
*C09J 9/00* (2006.01)
*C09J 133/08* (2006.01)
*C09J 133/12* (2006.01)
*B05D 3/00* (2006.01)

(52) U.S. Cl.
USPC ........... 524/100; 524/355; 524/361; 524/376; 428/704; 427/393.5; 106/287.21

(58) Field of Classification Search
USPC .................. 524/100, 355, 361, 376; 428/704; 427/393.5; 106/287.21
See application file for complete search history.

(56) References Cited

U.S. PATENT DOCUMENTS

| | | | | |
|---|---|---|---|---|
| 5,959,008 A | * | 9/1999 | Birbaum et al. ............... | 524/100 |
| 6,013,704 A | * | 1/2000 | Hayoz et al. .................. | 524/100 |
| 6,255,483 B1 | * | 7/2001 | Fletcher et al. ............... | 544/216 |
| 2006/0252857 A1 | * | 11/2006 | Schafer et al. ................ | 524/100 |

* cited by examiner

*Primary Examiner* — Kriellion Sanders
(74) *Attorney, Agent, or Firm* — Novak Druce Connolly Bove + Quigg LLP

(57) ABSTRACT

Compositions, suitable for coating surfaces, methods for their preparation and for coating surfaces therewith, where said compositions comprise: (a) 100,000 parts by weight of a primer composition comprising a binder material (a1), a primer solvent (a2) and a UV absorber (a3), wherein the primer composition is suitable as an adhesion-promoting agent between a thermoplastic substrate and a siloxane-based top coat; (b) 0 to 900,000 parts by weight of a solvent, and (c) 1 to 3000 parts by weight of a compound according to the general formula (I):

(I)

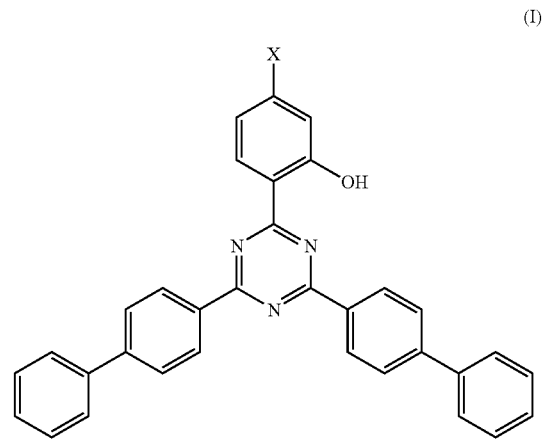

wherein X represents a moiety selected from the group consisting —$OR^6$, —$OCH_2CH_2OR^6$, —$OCH_2CH(OH)CH_2OR^6$ and —$OCH(R^7)COOR^8$, wherein $R^6$ represents a branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^7$ represents H or a branched or unbranched $C_1$-$C_8$ alkyl, and $R^8$ represents a $C_1$-$C_{12}$ alkyl, a $C_2$-$C_{12}$ alkenyl or a $C_5$-$C_6$ cycloalkyl, and wherein the composition has a viscosity of 40 s to 140 s measured in accordance with DIN EN ISO 2431 at 23° C. and with a 2 mm cup.

22 Claims, No Drawings

UV PROTECTIVE COMPOSITIONS, PROCESSES FOR PREPARING SUCH COMPOSITIONS, METHODS OF COATING SUBSTRATES THEREWITH AND MULTI-LAYER ARTICLES FORMED THEREBY

BACKGROUND OF THE INVENTION

Organic binder materials having good adhesion to both polycarbonate surfaces and siloxane-based top coats have been described, for example, in U.S. Pat. No. 5,041,313 and U.S. Pat. No. 5,391,795, and the patents cited therein, the entire contents of each of which are hereby incorporated herein by reference, for use as adhesion-promoting agents in the coating of polycarbonate. In addition to the adhesion-promoting agent, these primer coats can also contain a UV absorber, as mentioned in U.S. Pat. No. 5,041,313 and U.S. Pat. No. 5,391,765, thereby contributing to the weathering resistance of the coated component.

A survey of the integration of a UV protective function into a scratch-resistant-coated polycarbonate substrate is provided by U.S. Pat. No. 4,410,594, the entire contents of which are hereby incorporated herein by reference, in which the preferred variant of impregnating the polycarbonate part with a UV absorber and then coating it first with a primer and then with a top coat has two serious disadvantages. Firstly, impregnation is an additional process stage in an already multi-stage production process and is therefore economically inefficient. Secondly, this method has the disadvantage that UV light, which is damaging to polycarbonate, is not filtered out by the primer and/or top coat before reaching the PC surface but instead meets the PC surface, where it is absorbed—and only then to a partial extent, owing to competition from the likewise absorbing polycarbonate by the UV absorber diffused into the PC. The UV protective action in this variant is correspondingly lower as compared with the use of the UV absorber in the primer and/or top coat. When the UV absorber is used exclusively in the top coat, as is likewise disclosed in U.S. Pat. No. 4,410,594, the protective action is slight owing to the limited compatibility of organic UV absorbers in the siloxane-based top coat. Accordingly, it makes sense to have an additional UV protective action from the additional or sole use of a UV absorber in the primer. U.S. Pat. No. 6,350,521 describes a primer which contains both non-silylated and silylated dibenzoylresorcinol derivatives.

The use of a UV absorber in the primer brings about a high degree of UV extinction and hence a good UV protective function with a high film thickness. This high film thickness of a primer layer is achieved in turn through a high solids content in the paint, which ensures that when the paint is applied to the part, a large amount of the paint material to be cured or dried remains after the solvent has evaporated. This high solids content is itself associated with a high viscosity and hence with difficult processing.

This difficult processing is manifested, for example, as follows.

(a) During flow coating or dip coating of parts, a high viscosity leads to large film thickness variations in the flow coating or dipping direction, known as a film thickness wedge. This occurs to a particular extent with large and intricately shaped 3D parts. Since the properties of a paint remain approximately uniform only in a relatively narrow film thickness window, these large film thickness variations lead to a deterioration in the properties of the part, such as for example reduced weathering resistance or increased susceptibility to cracking in the top coat to be applied over the thick film primer.

(b) Furthermore, when coating a part the flow characteristics of a paint at the drip edge are significantly less favorable at high viscosity than at a lower viscosity, and this can lead to varnish runs or even to the formation of drip lines on the lower edge, the drip edge, of the part.

(c) Three-dimensional parts with a large curvature cannot be coated at all with high-viscosity thick film primers. The viscosity of the primer normally has to be reduced in order to have any possibility of obtaining a good visual coating quality on the part. This is done by reducing the solids content in the paint solution, leading to a reduction in the dry film thickness. Since UV absorption and hence the UV protective function are dependent on film thickness, the UV protection in the reduced film thickness is then insufficient, and a deterioration in properties occurs.< >

EP-A 72732 discloses a layer assembly of a polycarbonate, a primer and a top coating layer in which the primer layer contains a UV stabilizer based on resorcinol derivatives. The latter do however only have limited solubility which means that the primer layer becomes turbid if the attempt is made to increase the concentration of these UV stabilizers in order to sufficiently increase the extinction in the UV range. It is therefore not possible to obtain satisfactory UV stabilization of a transparent substrate. Also, the addition of large quantities of a UV stabilizer based on resorcinol derivatives produces an increase in the viscosity of the primer compositions, thus making them difficult to process. Other UV stabilizers, such as those based on triazine, also have similarly low solubility, which makes it impossible to increase their concentration in order to increase extinction in the UV range.

BRIEF SUMMARY OF THE INVENTION

The various embodiments of the present invention provide a UV protective primer composition having a good UV protective action with good, i.e. equal or better, processability.

The present invention relates to a composition containing
(a) 100,000 parts by weight of a primer composition suitable as an adhesion-promoting agent between a thermoplastic substrate and a siloxane-based top coat and containing binder material (a1), solvent (a2) and UV absorber (a3);
(b) 0 to 900,000 parts by weight of a solvent, and
(c) 1 to 3000 parts by weight of a compound having formula (I):

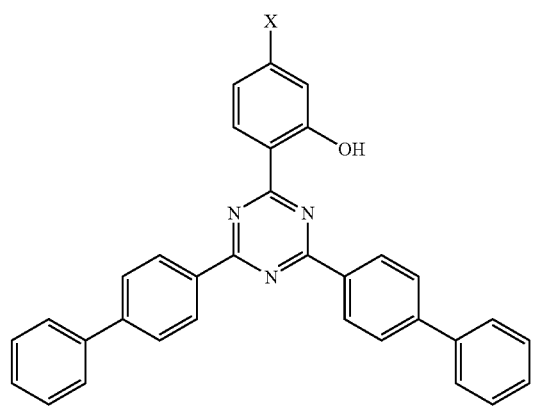

wherein X=$OR^6$, $OCH_2CH_2OR^6$, $OCH_2CH(OH)CH_2OR^6$ or $OCH(R^7)COOR^8$, wherein $R^6$=branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^7$=H or branched or unbranched $C_1$-$C_8$ alkyl, and $R^8$=$C_1$-$C_{12}$ alkyl, $C_2$-$C_{12}$ alkenyl or $C_5$-$C_6$ cycloalkyl, wherein the composition has a viscosity of 40 s to 140 s measured in accordance with DIN EN ISO 2431 at 23° C. and with a 2 mm cup.

One embodiment of the present invention includes compositions comprising: (a) 100,000 parts by weight of a primer composition comprising a binder material (a1), a primer solvent (a2) and a UV absorber (a3), wherein the primer composition is suitable as an adhesion-promoting agent between a thermoplastic substrate and a siloxane-based top coat; (b) 0 to 900,000 parts by weight of a solvent, and (c) 1 to 3000 parts by weight of a compound according to the general formula (I), wherein X represents a moiety selected from the group consisting —$OR^6$, —$OCH_2CH_2OR^6$, —$OCH_2CH(OH)CH_2OR$ and —$OCH(R^7)COOR^8$, wherein $R^6$ represents a branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^7$ represents H or a branched or unbranched $C_1$-$C_8$ alkyl, and $R^8$ represents a $C_1$-$C_{12}$ alkyl, a $C_2$-$C_{12}$ alkenyl or a $C_5$-$C_6$ cycloalkyl, and wherein the composition has a viscosity of 40 s to 140 s measured in accordance with DIN EN ISO 2431 at 23° C. and with a 2 mm cup.

It also relates to a process for improving the processability of thick film primers (adhesion-promoting paints known as primers, usually based on organic binder materials and with film thicknesses measured after the paint has cured of ≥1 μm) without detrimentally affecting the functional properties of the thick film primer with respect to UV protective action and improving the adhesion between a substrate and a top coat. It also relates to a paint formulation consisting of the primer composition of a thick film primer plus special solid and liquid additives, in the form of a special UV absorber and suitable solvents, along with the multi-layer products produced with this paint formulation. These multi-layer products have a first layer consisting of a plastic substrate, a second layer consisting of the cured primer layer based on the paint formulation according to the invention produced by means of the process according to the invention and a third layer consisting of a cured top coat.

Another embodiment of the present invention includes processes comprising: (i) mixing a primer composition (a) comprising polymethyl methacrylate (a1), 1-methoxy-2-propanol and diacetone alcohol (a2), and dibenzoyl resorcinol (a3), and having a viscosity of >90 s measured in accordance with DIN EN ISO 2431 at 23° C. and with a 2 mm cup, with a solvent (b) such that a first mixture having a solids content of about 2 to 9.5 wt. % is obtained; (ii) mixing the first mixture with 0.01 to 15 wt. % of a compound (c) according to the general formula (I), to form a second mixture; and (iii) homogenizing the second mixture.

Yet another embodiment of the present invention includes processes comprising: (i) applying a second layer of a composition according to an embodiment of the present invention to at least a portion of a first layer comprising a thermoplastic polymer; and (ii) curing the composition to form a multi-layer article. Additional embodiments include further (iii) applying a top coat formulation to at least a portion of the second layer; and (iv) curing the top coat formulation.

Still yet other embodiments of the present invention include multi-layer articles prepared by processes according to the various other embodiments of the present invention.

Still yet other embodiments of the present invention include multi-layer articles prepared by processes according to the various other embodiments of the present invention. Still another embodiment of the present invention is multi-layered article which is obtained by curing the abovementioned compositions according to the invention. The layer assembly comprises:

i) a thermoplastic substrate on which a
ii) primer layer is superimposed, characterized in that the primer layer is obtained by curing the composition according to claim 1. The product can also contain a top coating layer as an additional layer.

Surprisingly it was found that the coating of plastic parts is improved with the compositions according to the invention; this is evidenced by (a) a narrower film thickness distribution on the part, (b) a cleaner flow of the paint at the drip edge of the part, (c) better coating ability even of intricate 3D parts in the sense of a more uniform distribution of the paint over the part, and with no loss of UV protection, in other words a comparable extinction at 340 nm despite the lower film thickness. Surprisingly, it has also been found that the use of a combination of UV absorbers from the hydroxylbenzophenone class of compounds, and in particular resorcinol-based UV stabilizers of the general formula (II) and triazine based UV stabilizers of the formula (I) in particular in primer compositions for transparent thermoplastic substrates, such as in particular those of polycarbonates, produces sufficient UV protection for the transparent thermoplastic layer assemblies without the primer layer and therefore the entire transparent layer becoming turbid.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a compound" herein or in the appended claims can refer to a single compound or more than one compound. Additionally, all numerical values, unless otherwise specifically noted, are understood to be modified by the word "about."

Within the context of the present invention, the expression "composition" denotes a mixture of individual components. These components may react with one another during or after the mixing process or not at all. In macroscopic terms, a composition is substantially homogeneous.

Within the context of the present invention, the expression "primer composition" (component (a)) denotes suitable thick film primer formulations, comprising a binder material (a1) in a primer solvent (a2) and a UV absorber (a3) and possibly further additives or stabilisers (a4) such as antioxidants, hindered amines or dyes or inorganic fillers.

Particularly suitable and therefore preferred as a binder material are polyacrylates, suitable polyacrylate types being both those that simply dry as the paint formulation (a) cures, without undergoing a chemical reaction, as well as those that are also crosslinked by means of a chemical reaction during curing. Suitable primer solvents (a2) include organic solvents such as alkanes, alcohols, ethers, esters or ketones, with emulsions of polyacrylate in water or water-based solvent blends also being suitable in principle. Suitable UV, absorbers (a3) include derivatives of the following general groups, 2-hydroxybenzophenones, 2-(2-hydroxyphenyl)benzotriazoles, 2-(2-hydroxyphenyl)-1,3,5-triazines, oxalanilides, 2-cyanacrylates, benzylidene malonates and formamidines.

Such primer formulations are known in principle and are disclosed in detail in, for example, U.S. Pat. No. 5,391,795, U.S. Pat. No. 5,041,313 and U.S. Pat. No. 4,410,594. For example, SHP 470 from Momentive Performance Materials, Inc. is an adhesion-promoting agent based on polymethyl methacrylate with, inter alia, 1-methoxy-2-propanol and diacetone alcohol as solvents, and dibenzoyl resorcinol as a UV absorber. The ready-to-use diluted SHP 470 (solids content approximately 6 wt. %) has a viscosity of >90 s measured in accordance with DIN EN ISO 2431 at 23° C. and with a 2 mm cup. This primer can be used for improving the adhesion between a polycarbonate substrate and polysiloxane top coats, AS4700 from Momentive Performance Materials Inc. being preferably used here. U.S. Pat. No. 6,350,521 describes a primer which contains both non-silylated and silylated dibenzoylresorcinol derivatives.

Within the context of the present invention, the expression "suitable as an adhesion-promoting agent between a thermoplastic substrate and a siloxane-based top coat" means that the primer composition improves the adhesion of a siloxane-based top coat to a thermoplastic substrate.

Component (b) comprises solvents which must be compatible with a first layer, the plastic substrate, and allow dispersion, application and drying of the composition to such an extent that after curing of the composition to form a second layer, a multi-layer product having high transparency and low haze is obtained. By way of example and by preference, these solvents include alkanes, alcohols, ethers, esters or ketones. The term solvent here is also understood to include solvent blends. Alcohols (with the exception of methanol), ethyl acetate and butanone are particularly preferably used. Solvents or solvent blends selected from at least one of the group consisting of diacetone alcohol $(CH_3)_2C(OH)CH_2C(=O)CH_3$, ethyl acetate, methoxypropanol and butanone are most particularly preferred.

Component (c) comprises derivatives of biphenyl triazine having the following formula (I):

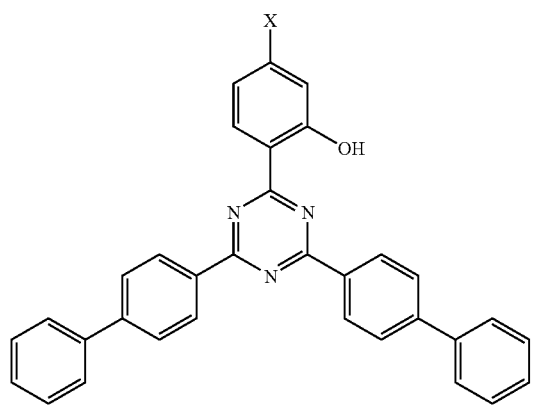

(I)

wherein $X=OR^6$, $OCH_2CH_2OR^6$, $OCH_2CH(OH)CH_2OR^6$ or $OCH(R^7)COOR^8$, preferably $OCH(R^7)COOR^8$, $R^6$ branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^7$=H or branched or unbranched $C_1$-$C_8$ alkyl, preferably $CH_3$, and $R^8$=$C_1$-$C_{12}$ alkyl, $C_2$-$C_{12}$ alkenyl or $C_5$-$C_6$ cycloalkyl, preferably $C_8H_{17}$.

A UV absorber according to formula (I) in which $X=OCH(R^7)COOR^8$, $R^7=CH_3$ and $R^8=C_8H_{17}$, in particular $R^8$ represents i-octyl, i.e. 2-[2-hydroxy-4-[(octyloxycarbonyl)ethylideneoxy]phenyl-4,6-di(4-phenyl)phenyl-1,3,5-triazine, is particularly preferably used as component (c). The compound has the CAS No. 204848-45-3 and is available from Ciba Speciality Chemicals under the name Tinuvin 479 (hereinafter also referred to as CGL 479).

The biphenyl-substituted triazines having the general formula (I) and their production are known from WO96/28431; DE19739797; WO00/66675; U.S. Pat. No. 6,225,384; U.S. Pat. No. 6,255,483; EP1308084 and DE10135795, the entire contents of each of which are hereby incorporated herein by reference.

In a preferred embodiment, the UV absorbers have a high UV absorption in the range of greatest sensitivity of the first layer; the UV absorbers particularly preferably have a UV absorption maximum between 300 and 340 nm.

In an additional preferred embodiment the UV absorbers of the formula (I) are preferably employed using 2-hydroxybenzophenones as the preferred UV absorber (a3). Preferred 2-hydroxybenzophenone are dibenzoylresorcinols. Preferred dibenzoylresorcinols are selected from compounds of the formula (IIa) and (IIb)

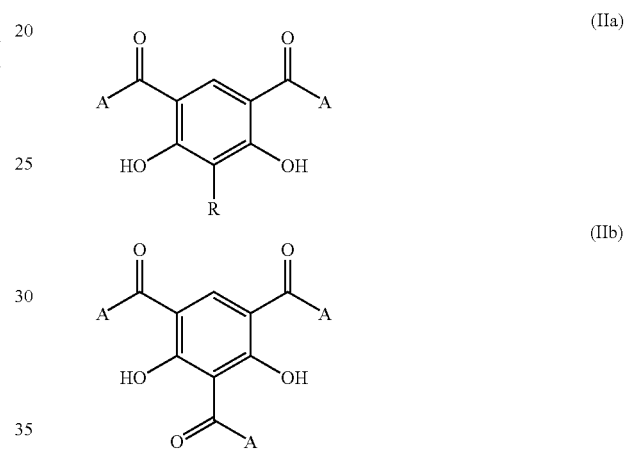

wherein each A is independently a substituted or unsubstituted monocyclic or polycyclic aromatic radical, and said substituted monocyclic or polycyclic aromatic radical has substituents selected from the group consisting of hydrogen, halogens, alkoxy groups, $C_{1-8}$ alkyl groups and hydroxy groups and R is hydrogen or a linear or branched aliphatic chain having less than 10 carbons. A independently is preferably phenyl or 4-tert.butylphenyl. R is preferably hydrogen, propyl or 3.triethoxysilylpropyl.

Therefore preferred UV absorbers of the Formula (II) are 4,6-dibenzoyl resorcinol, 4,6-di(4-tert.-butylbenzoyl)resorcinol, 4,6-dibenzoyl-2-propylresorcinol, 2,4,6-tribenzoylresorcinol and 4,6-dibenzoyl-2-(3-triethoxysilylpropyl)resorcinol.

Within the context of this invention, suitable plastic substrates for the first layer of the multi-layer products are polycarbonate, polyester carbonate, polyesters (such as polyalkylene terephthalate, for example), polyphenylene ethers, graft copolymers (such as ABS, for example) and mixtures thereof.

The first layer is preferably polycarbonate, in particular homopolycarbonate, copolycarbonate and/or thermoplastic polyester carbonate.

Within the context of this invention, suitable primer layers for the second layer of the multi-layer products are the layers formed from the paint formulation according to the invention by curing. The term curing here encompasses both chemical crosslinking and drying without a reaction, depending on the type of primer used.

The particular production method for the paint formulations according to the invention will depend on the precise solids and UV absorber content and on the extinction at a given film thickness of the commercial thick film primer used. The invention described here can be used to prepare any blend of components (a), (b) and (c), with the following preferences noted. A dilution of component (a) to 10 to 100% with component (b) is preferred, i.e. the weight of the starting formulation (component (a)) is 10 to 100% relative to the weight of the formulation after dilution (component (a) plus component (b)), a dilution to 20 to 90% being particularly preferred. An addition of UV absorber (component (c)) of 0.01 wt. % to 30 wt. % relative to the solids content of the formulation is preferred, with 0.1 to 15 wt. % being particularly preferred, in this context a high proportion of UV absorber is preferably added, at the time when component (a) is heavily diluted (a high amount of component (b) is used). The individual components can be added one after another or at the same time; the preferred route, however, is to add component (c), dissolved in at least a part of component (b) or additional suitable solvent, to component (a) along with any remaining quantity of component (b).

The general production process is described here by way of example, but without being restricted thereby, on the basis of the commercially available SHP 470 with a solids content of approximately 10% and an extinction of around 1.2 at 340 nm and at a film thickness of 2 µm, from Momentive Performance Materials Inc., Wilton, Conn., USA. SHP470 is an adhesion-promoting agent based on polymethyl methacrylate with inter alia 1-methoxy-2-propanol and diacetone alcohol as solvents and dibenzoyl resorcinol as UV absorber. The ready-to-use diluted SHP 470 (solids content approximately 6 wt. %) has a viscosity of >90 s measured in accordance with DIN EN ISO 2431 at 23° C. and with a 2 mm cup. This primer is used for improving the adhesion between a polycarbonate substrate and polysiloxane top coats, AS4700 from Momentive Performance Materials Inc. being preferably used here. The SHP470 (component (a)) is preferably diluted to 20 to 95%, particularly preferably to 25 to 90%, preferably with alcohols (component (b)), particularly preferably with diacetone alcohol, methoxypropanol or mixtures thereof, giving a solids content of approximately 2 to 9.5 wt. %, preferably 2.5 to 9 wt. %, and mixed with 0.01 to 15 wt. %, preferably 0.1% to 10 wt. %, particularly preferably 1% to 7 wt. % (based on the solids content of component (a)), of a triazine UV absorber (component (c)), preferably a biphenyl triazine UV absorber having the general formula (I), particularly preferably the UV absorber CGL479, and homogenised in a suitable manner during said process and/or afterwards. Here too it is advantageous to dissolve component (c) in diacetone alcohol, methoxypropanol or mixtures thereof and to add it to the SHP470 in that form. The ideal dilution ratio is dependent on the size and geometry of the part and on the paint application method and should be adjusted to the individual case. The ratio of 5 wt. % of CGL 479 based on the solids content of SHP470 with a solids content of approximately 6 wt. % is preferred, giving an extinction of approximately 1.2 at a film thickness of 1 µm. If SHP470 is used without additional UV absorber, this is only achievable at or above a film thickness of 2 µm.

Within the context of this invention, suitable top coats for the third layer of the multi-layer products are the layers formed from suitable top coats by curing.

Suitable top coats are, for example, formulations of scratch-resistant or abrasion-resistant paints, for example but not exclusively polysiloxane paints, such as are known for example from U.S. Pat. No. 4,373,061, U.S. Pat. No. 4,410,594, U.S. Pat. No. 5,041,313 and also from U.S. Pat. No. 5,391,795, the entire contents of each of which are hereby incorporated herein by reference; silicate based coatings (soluble glass) and nanoparticle-containing formulations can also be mentioned here which are applied to the second layer, the primer, and then can be cured to form a multi-layer product having good adhesion.

The invention also provides a process for producing a multi-layer product, wherein (i) in a first step the second layer in the form of the paint formulation according to the invention is applied to the first layer, which is preferably a plastic moulded article of any shape produced from the thermoplastic polymer, particularly preferably polycarbonate, by injection moulding or extrusion, and (ii) in a second step the primer coating formulation of the second layer is cured, the term curing here encompassing both chemical crosslinking and drying without a reaction, depending on the type of primer used, and (iii) in a third step the third layer in the form of the top coat formulation is applied to the surface of the second layer, and (iv) in a fourth step the top coat formulation of the third layer is cured.

In the first step (i) the paint formulation is preferably applied to the surface of the first layer by flow coating, dip coating, spraying, roll coating, spin coating or another suitable method and is then cured in the second step at room temperature and/or elevated temperature (preferably 20 to 200° C., particularly preferably 40 to 130° C.). The surface of the first layer can be pretreated by cleaning or activation. The application and curing method (steps (iii) and (iv)) is dependent on the type of top coat used.

The invention also provides the production of the multi-layer products and the products constructed from the multi-layer products. The present invention likewise provides the use of said multi-layer products in particular for outdoor applications with enduringly high requirements in terms of visual impression, such as glazing applications for example. This multi-layer product is by way of example a glazing product such as for example architectural glazing products, automotive glazing products, headlamp lenses, spectacle lenses or helmet visors.

The invention will now be described in further detail with reference to the following non-limiting examples.

EXAMPLES

General

Unless otherwise specified, quantities given below are in wt. %.

All solvents were bought as technical products and used without drying.

Solids Content Determination (Method A):

The solids content of the paints was determined using a Sartorius MA40 solids tester by evaporating a weighed paint sample at 140° C. until a constant weight was reached. The solids content is then calculated as a percentage from the quotient of the mass after to the mass before evaporation. In the simplest case, the solids content of the paint after curing of the paint is the weight of the paint less the weight of the solvent.

Viscosity Determination (Method B):

The viscosities of the paint solutions were determined by reference to DIN EN ISO 2431 using Erichsen flow cups with a nozzle diameter of 4 mm or 2 mm in seconds at 23° C.

Film Thickness Determination (Method C):

The film thickness of the cured paints is determined by means of white light interference using an Eta SD30 measuring instrument from Eta Optik GmbH, Germany.

Extinction Determination (Method D):

The extinction of the primer after application on a polycarbonate substrate and subsequent curing was determined using a Cary 50 UV-Vis spectrophotometer from Varian Inc., USA, using an uncoated but otherwise identical polycarbonate substrate as the background spectrum.

Example 1

A solids content of 9.96% was determined for the commercially available thick film primer SHP 470 (Momentive Performance Materials Inc. Wilton, Conn. USA) using method A.

The viscosity of this paint solution was determined using a flow cup with a 4 mm diameter nozzle in accordance with method B, giving a value of 53.41 s. The determination of the viscosity using a flow cup with a 2 mm diameter nozzle was not possible because the paint solution was too ductile in flowability.

This paint was applied by the flow-coating method to a polycarbonate sheet (injection-moulded optical-grade polycarbonate (PC) sheets made from Makrolon® 2808 (Bayer MaterialScience AG; medium-viscosity bisphenol A polycarbonate, MFR 10 g/10 min in accordance with ISO 1133 at 300° C. and 1.2 kg, without UV stabilisation) and measuring 10.5×15×0.32 cm), allowed to dry for 30 min and then cured for 15 min at 125° C.

In the flow-coating direction from flow edge to drip edge, a film thickness of 4.4 μm was determined on the sheet in accordance with method C after just 3 cm (in other words still in the flow area), rising to 8.8 μm 3 cm before the drip edge (i.e. after 12 cm).

Since this paint, according to the manufacturer's specifications, has its ideal property profile in a layer thickness range of 2 to 4 μm, it has to be diluted—in the case of the coating process used and the component to be coated—in order to obtain a lower layer thickness on the component in accordance with the specifications. Outside the layer thickness required according to the specifications, i.e. of below 2 μm or above 4 μm, insufficient weathering resistance is obtained. This insufficient weathering stability is manifested by the fact that the specimen layers fail to provide protection at a significantly earlier point in time than specimen layers with a thickness within the 2 to 4 μm range, due to delamination or crack formation during weathering.

Example 2

A stock paint solution was produced from the commercially available thick film primer SHP 470 (solids content 9.90% and viscosity with a 4 mm cup 46.25 s (for determination see methods A and B) and a 1:1 solvent blend of diacetone alcohol and 1-methoxy-2-propanol, by measuring out 300.0 g of SHP 470 (9.9 wt. %) and adding 97.5 g each of diacetone alcohol and 1-methoxy-2-propanol whilst stirring. The solution obtained is referred to as stock solution 2A.

0.12 g of CGL 479 were added whilst stirring to 100 g of this stock solution 2A to produce stock solution 2B with 2 wt. % of CGL 479 relative to the experimentally determined solids content of A (for determination see method A) of 5.95%.

0.30 g of CGL 479 were added to a further 100 g of stock solution 2A to produce stock solution 2C with 5 wt. % of the UV absorber from the biphenyl triazine class relative to the experimentally determined solids content of 2A.

The following characteristic values were obtained for these three paint solutions.

TABLE 1

| Example | Solids content in wt. % | Viscosity 2 mm cup | Viscosity 4 mm cup | Comments |
|---------|--------------------------|--------------------|--------------------|----------|
| 2A | 5.95% | 106.4 sec | 15.15 sec | — |
| 2B | 5.95% | 108.8 sec | 15.16 sec | +2 wt. % CGL 479 |
| 2C | 5.95% | 110.1 sec | 15.21 sec | +5 wt. % CGL 479 |

This shows that the addition of UV absorber causes only a slight rise in viscosity and that these modified paint solutions have only ⅓ of the viscosity, measured in accordance with method B, as compared with the original paint (46.25 s).

These three paint solutions were then applied by the flow-coating method to polycarbonate sheets (injection-moulded optical-grade polycarbonate sheets made from Malcrolon® 2808 (Bayer MaterialScience AG; medium-viscosity bisphenol A polycarbonate, MFR 10 g/10 min in accordance with ISO 1133 at 300° C. and 1.2 kg, without UV stabilisation) and measuring 10.5×15×0.32 cm), allowed to dry for 30 min at room temperature and cured for 15 mm at 115° C.

On the primed sheets obtained in this way the extinction of the primer only (uncoated Malcrolon®2808 as background spectrum) was determined in accordance with method D at 340 nm as a function of the experimentally determined paint film thickness (determined using method C) at each measuring point.

TABLE 2

| | | Extinction of paint at 340 nm | | | |
|---|---|---|---|---|---|
| Example | Addition of CGL 479 | 1.0 μm film thickness | 1.5 μm film thickness | 2.0 μm film thickness | 2.5 μm film thickness |
| 2A | 0 | 0.60 | 0.95 | 1.20 | 1.60 |
| 2B | 2 wt. % | 0.82 | 1.16 | 1.44 | 1.75 |
| 2C | 5 wt. % | 1.17 | 1.60 | 1.95 | 2.30 |

Table 2 shows that SHP 470 without further UV light-absorbing additives (stock solution A) has an extinction contribution of 1.2 at 340 nm at the minimum film thickness according to the manufacturer's specification of 2 μm.

The minimum film thickness is determined here primarily by the extinction contribution of the primer necessary for the full range of properties of the paint, in accordance with the Lambert-Beer law $$E = \log I_0/I = \epsilon c d$$

where E: extinction;
$I_0$, I: intensity of the incident and transmitted light respectively;
$\epsilon$: molar extinction coefficient in $1 \text{ mol}^{-1} \text{ cm}^{-1}$;
c: concentration in $\text{mol l}^{-1}$; and
d: film thickness in cm;
(at a given concentration of the UV absorber with a defined extinction coefficient the extinction can only be varied any further by means of the film thickness), since an adhesion-promoting action of such primer systems—as the example of SHP 401 (pure primer, with no significant UV protection contribution) from Momentive Performance Materials with a film thickness window of 0.5 to 1.0 μm according to the manufacturer's specification shows—is provided to a similar extent even at significantly lower film thicknesses.

This list also shows that the minimum extinction contribution of pure SHP 470 (example 2A) for the full range of properties of the paint of 1.2 at 340 nm (in other words the value at the minimum film thickness of 2 μm (according to the manufacturer's specification)) is achieved in the examples having an addition of CGL 479 (2B—2 wt. % of CGL 479 and 2C—5 wt. % of CGL 479) at just 1.5 μm and 1 μm respectively, with no negative influence on the processing characteristics such as solids content and viscosity of the diluted paint.

By reducing the minimum film thickness necessary for the range of properties of the paint, the processing window of SHP 470 is extended with regard to film thickness, with a doubling of the film thickness in the flow-coating direction (the film thickness wedge) on the sheet (flow area ≥2 μm; drip area ≤4 μm, in order to remain within specification) and a quadrupling of the film thickness (flow area ≥1 μm; drip area ≤4 μm) in the case of example 2C.

The significance of this for the coating of larger parts is demonstrated by the coating of extruded PC sheets of length 40 cm (extruded polycarbonate (PC) sheets made from Makrolon® 3103 (Bayer MaterialScience AG; high-viscosity bisphenol A polycarbonate, MFR 6.5 g/10 min according to ISO 1133 at 300° C. and 1.2 kg, with UV stabilisation) and measuring 10×40×0.4 cm).

TABLE 3

| | Film thickness in μm as a function of the position on the sheet (distance in cm from the flow edge) | | | | | | | | |
|---|---|---|---|---|---|---|---|---|---|
| Example | 3 cm | 5 cm | 10 cm | 15 cm | 20 cm | 25 cm | 30 cm | 35 cm | 36 cm | 37 cm |
| 2A | 1.3 | 1.5 | 2.1 | 2.9 | 3.0 | 3.2 | 3.2 | 3.4 | 3.4 | 3.5 |
| 2B | 1.3 | 1.5 | 2.1 | 2.3 | 2.6 | 2.9 | 3.1 | 3.3 | 3.4 | 3.4 |
| 2C | 1.4 | 1.8 | 2.3 | 2.5 | 2.7 | 3.1 | 3.2 | 3.6 | 3.7 | 3.9 |

A film thickness of approximately 1.3 μm in the flow area and approximately 3.5 μm in the drip area was achieved with the dilution according to the invention to a solids content of approximately 6% as chosen in this case. However, in example 2A, i.e. with no additional UV absorber, a film thickness ensuring the minimum UV protective function of the primer is only achieved on the sheet after 10 cm in the flow-coating direction. With the additional use according to the invention of a biphenyl triazine derivative as UV absorber, the minimum UV protective function is already achieved in the flow area, which means that there is no premature UV-related failure of the paint in the flow area, even if the minimum thickness according to the specification of the original SHP 470 is not achieved.

Example 3

The commercially available thick film primer SHP 470 (solids content 9.90% and viscosity with a 4 mm cup 46.25 s (for determination see methods A and B)) was used. 65 g of a 1:1 solvent blend (based on weight) of diacetone alcohol and 1-methoxy-2-propanol and 0.49 g of CGL 479 were added to 100 g of the solution. Paint solution example 3A was obtained containing 5 wt. % of CGL 479 relative to the experimentally determined solids content (for determination see method A) of 5.95%.

Further dilutions, examples 3B to 3D, are then produced in the same way. The initial weights are listed in Table 4 below:

TABLE 4

| Example | Commercial SHP 470 | UV absorber CGL 479 | Solvent | Actual solids content |
|---|---|---|---|---|
| 3A | 100 g | 0.49 g | 65.00 g | 5.95% |
| 3B | 100 g | 0.49 g | 98.00 g | 5.08% |

TABLE 4-continued

| Example | Commercial SHP 470 | UV absorber CGL 479 | Solvent | Actual solids content |
|---|---|---|---|---|
| 3C | 100 g | 0.49 g | 147.50 g | 4.12% |
| 3D | 100 g | 0.49 g | 230.00 g | 3.18% |

The following characteristic values were obtained for these four paint solutions:

TABLE 5

| Example | Solids content | Viscosity 2 mm cup | Viscosity 4 mm cup | Comments |
|---|---|---|---|---|
| 3A | 5.95% | 106.4 sec | 15.15 sec | |
| 3B | 5.08% | 84.3 sec | nd | |
| 3C | 4.12% | 69.0 sec | nd | |

TABLE 5-continued

| Example | Solids content | Viscosity 2 mm cup | Viscosity 4 mm cup | Comments |
|---|---|---|---|---|
| 3D | 3.18% | 59.4 sec | nd | |
| Comparison 3E: SHP 401 (in original commercial state) | 2.30% | 56.2 sec | nd | Primer for AS 4000 (from Momentive Performance Materials Inc.) |

The expression "nd" in the table stands for "not determined".

This shows that the viscosity can be lowered significantly by dilution. It was thus possible to reduce the viscosity by half.

These four paint solutions were then applied by the flow-coating method to polycarbonate sheets (extruded polycarbonate (PC) sheets made from Makrolon® 3103 (Bayer MaterialScience AG; high-viscosity bisphenol A polycarbonate, MFR 6.5 g/10 min in accordance with ISO 1133 at 300° C. and 1.2 kg, with UV stabilisation) and measuring 10×40×0.4 cm), allowed to dry for 30 min at room temperature and cured for 15 min at 115° C.

The flow and processing characteristics improved as the dilution increased. At the same time the formation of drip lines decreased:

TABLE 6

| Example | Solids content in wt. % | Processing characteristics |
|---|---|---|
| 3A | 5.95% | Good flow, marked formation of drip lines |
| 3B | 5.08% | Good flow, slight formation of drip lines |
| 3C | 4.12% | Very good flow, virtually no runs or drip lines |
| 3D | 3.18% | Very good flow, virtually no runs or drip lines |

The film thickness was determined in accordance with method C on the coated sample sheets.

TABLE 7

Film thickness in μm as a function of the position on the sheet (distance in cm from the flow edge)

| Example | 3 cm | 5 cm | 10 cm | 15 cm | 20 cm | 25 cm | 30 cm | 35 cm | 36 cm | 37 cm |
|---|---|---|---|---|---|---|---|---|---|---|
| 3A | 1.3 | 1.5 | 2.1 | 2.9 | 3.0 | 3.2 | 3.2 | 3.4 | 3.4 | 3.5 |
| 3B | 0.7 | 1.2 | 1.5 | 2.2 | 2.3 | 2.7 | 2.7 | 2.7 | 2.7 | 2.7 |
| 3C | 0.7 | 0.7 | 1.2 | 1.3 | 1.3 | 1.6 | 1.7 | 1.7 | 1.7 | 1.8 |
| 3D | 0.4 | 0.7 | 1.0 | 1.2 | 1.2 | 1.7 | 1.3 | 1.4 | 1.4 | 1.5 |

Example 4

50 g of the commercially available thick film primer SHP 470 (experimentally determined solids content 8.69% (for determination see method A)) were mixed whilst stirring with 86.9 mg of CGL 479 in the first case (4A with 2 wt. % of CGL 479), 217.3 mg of CGL 479 in the second case (4B with 5 wt. % of CGL 479) and with no CGL 479 in the third case (4C), and in each case with 5 g of diacetone alcohol (DAA).

These three paint solutions were then applied by the flow-coating method to polycarbonate sheets (injection-moulded optical-grade PC sheets made from Makrolon® AL2647 (Bayer MaterialScience AG; medium-viscosity bisphenol A polycarbonate with UV stabiliser and mould release agent; MFR 13 g/10 min in accordance with ISO 1133 at 300° C. and 1.2 kg) and measuring 10.5×15×0.32 cm), allowed to dry for 30 min at room temperature and cured for 30 min at 125° C. These primed sheets were top-coated with AS4700 (UV absorber-containing, polysiloxane-based top coat from Momentive Performance Materials) using the flow-coating method, allowed to dry for 30 min at room temperature and cured for 60 min at 130° C.

The thickness of the transparent two-layer coating obtained in this way (primer 4A, 4B and 4C/top coat AS4700) was determined in accordance with method C. The adhesion of this coating was determined by means of the following tests: a) adhesive tape test (adhesive tape used: 3M® 610), with and without cross-hatching (as described in ISO 2409 and ASTM D 3359); b) adhesive tape test after storing for 4 h in boiling water. Tests a) and b) were passed, i.e. no delamination of the coating occurred (rating 0 in. accordance with ISO 2409 and 5B in accordance with ASTM D 3359). These sheets also underwent an accelerated weathering test in an Atlas Ci 5000 Weatherometer with an irradiance of 0.75 W/m²/nm at 340 nm and a dry/rain cycle of 102:18 minutes (hereinafter referred to as Xenon WOM 0.75), wherein after differing weathering times the following yellowness index values (yellowness index determined with an Ultrascan XE® from Hunter in accordance with ASTM E 313) and haze values (haze values determined with a Hazegard® from Byk Gardner in accordance with ASTM D 1003) were obtained.

The yellowness index (col. 2, 3 and 4 in table 8) after differing Xenon WOM 0.75 weathering times in hours (col. 1 in table 8) is shown in Table 8 below:

TABLE 8

| | Coating | | |
|---|---|---|---|
| | 4A/AS 4700 | 4B/AS4700 | 4C/AS4700 |
| | Additional UV absorber in primer | | |
| | with 2 wt. % CGL 479 | with 5 wt. % CGL 479 | without CGL 479 |
| | Film thickness (primer/top coat) | | |
| | 1.4 μm/3.8 μm | 1.6 μm/3.6 μm | 1.4 μm/3.8 μm |
| 0 | 1.04 | 1.03 | 0.98 |
| 987 | 1.05 | 1.00 | 1.11 |
| 2000 | 1.50 | 1.43 | 1.53 |
| 2553 | 1.73 | 1.62 | 1.80 |
| 3000 | 1.89 | 1.81 | 2.09 |
| 4055 | 2.58 | 2.50 | 3.42(*) |
| 4994 | 3.28 | 2.97 | 4.96 |
| 6000 | 4.67(*) | 3.77(*) | 9.42 |
| 7055 | 6.11 | 5.41 | 11.93 |
| 8000 | 8.28 | 6.98 | 13.69 |

In Table 8 and in Table 9, the superscript asterisk (*) indicates first weathering defects such as incipient delamination or cracking.

The haze values in % (col. 2, 3 and 4 in table 9) after differing Xenon WOM 0.75 weathering times in hours (col. 1 in table 9) are set out in Table 9 below.

TABLE 9

| | Coating | | |
|---|---|---|---|
| | 4A/AS 4700 | 4B/AS4700 | 4C/AS4700 |
| | Additional UV absorber in primer | | |
| | with 2 wt. % CGL 479 | with 5 wt. % CGL 479 | without CGL 479 |
| | Film thickness (primer/top coat) | | |
| | 1.4 μm/3.8 μm | 1.6 μm/3.6 μm | 1.4 μm/3.8 μm |
| 0 | 0.4% | 0.4% | 0.4% |
| 987 | 0.6% | 0.7% | 0.6% |
| 2000 | 0.7% | 0.7% | 0.7% |
| 2553 | 1.0% | 0.8% | 0.8% |
| 3000 | 0.9% | 0.9% | 0.9% |
| 4055 | 1.0% | 1.0% | 1.3%(*) |
| 4994 | 1.15% | 1.14% | 1.91% |
| 6000 | 1.5%(*) | 1.4%(*) | 2.4% |
| 7055 | 2.4% | 2.4% | 6.1% |
| 8000 | 4.6% | 3.9% | 19.2% |

This weathering comparison shows that not only do the primer paint formulations according to the invention (4A and 4B) offer a higher extinction and hence the same UV protective function in a lower film thickness as the original primer in a higher film thickness that is more difficult to achieve (or conversely a higher UV protection in the same film thickness) (identified by the lower rise in YI over the weathering time for 4A and 4B as compared with 4C) but also that the other typical failure criteria in the weathering of coated PC parts, such as haze, delamination and cracking, occur significantly later (with the same film thickness).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A composition comprising:
   (a) 100,000 parts by weight of a primer composition comprising a binder material (a1), a primer solvent (a2) and a UV absorber (a3), wherein the primer composition is suitable as an adhesion-promoting agent between a thermoplastic substrate and a siloxane-based top coat;
   (b) 0 to 900,000 parts by weight of a solvent, and
   (c) 1 to 3000 parts by weight of a compound according to the general formula (I):

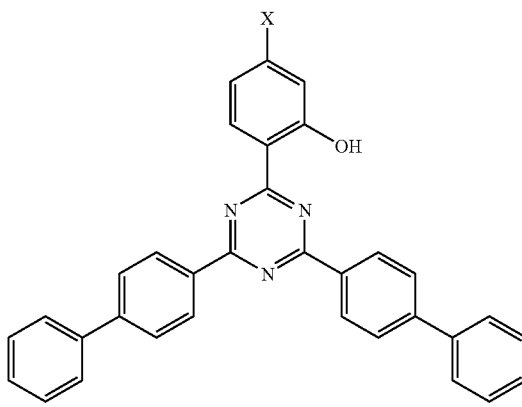

(I)

wherein X represents a moiety selected from the group consisting —$OR^6$, —$OCH_2CH_2OR^6$, —$OCH_2CH(OH)CH_2OR^6$ and —$OCH(R^7)COOR^8$, wherein $R^6$ represents a branched or unbranched $C_1$-$C_{13}$ alkyl, $C_2$-$C_{20}$ alkenyl, $C_6$-$C_{12}$ aryl or —CO—$C_1$-$C_{18}$ alkyl, $R^7$ represents H or a branched or unbranched $C_1$-$C_8$ alkyl, and $R^8$ represents a $C_1$-$C_{12}$ alkyl, a $C_2$-$C_{12}$ alkenyl or a $C_5$-$C_6$ cycloalkyl, and wherein the composition has a viscosity of 40 s to 140 s measured in accordance with DIN EN ISO 2431 at 23° C. and with a 2 mm cup;
wherein the UV absorber (a3) comprises dibenzoyl resorcinol.

2. The composition according to claim 1, wherein the composition has a viscosity of 50 s to 110 s measured in accordance with DIN EN ISO 2431 at 23° C. and with a 2 mm cup.

3. The composition according to claim 1, wherein the composition has a viscosity of 75 s to 100 s measured in accordance with DIN EN ISO 2431 at 23° C. and with a 2 mm cup.

4. The composition according to claim 1, wherein the solvent (b) is present in an amount of 11,111 to 400,000 parts by weight, and the compound according to the general formula (I) is present in an amount of 10 to 1500 parts by weight.

5. The composition according to claim 1, wherein the binder material (a1) comprises a polyacrylate.

6. The composition according to claim 1, wherein the compound according to the general formula (I) comprises 2-[2-hydroxy-4-[(octyloxycarbonyl)-ethylideneoxy]phenyl-4,6-di(4-phenyl)phenyl-1,3,5-triazine.

7. The composition according to claim 4, wherein the compound according to the general formula (I) comprises 2-[2-hydroxy-4-[(octyloxycarbonyl)-ethylideneoxy]phenyl-4,6-di(4-phenyl)phenyl-1,3,5-triazine.

8. The composition according to claim 1, wherein the binder material (a1) comprises polymethyl methacrylate, the primer solvent (a2) comprises 1-methoxy-2-propanol and diacetone alcohol and the UV absorber (a3) comprises dibenzoyl resorcinol; and wherein the primer composition has a viscosity of >90 s measured in accordance with DIN EN ISO 2431 at 23° C. and with a 2 mm cup.

9. The composition according to claim 4, wherein the binder material (a1) comprises polymethyl methacrylate, the primer solvent (a2) comprises 1-methoxy-2-propanol and diacetone alcohol and the UV absorber (a3) comprises dibenzoyl resorcinol; and wherein the primer composition has a viscosity of >90 s measured in accordance with DIN EN ISO 2431 at 23° C. and with a 2 mm cup.

10. The composition according to claim 1, wherein the solvent (b) comprises one or more compounds selected from the group consisting of diacetone alcohol ($CH_3$)$_2$C(OH)$CH_2$C(=O)$CH_3$, ethyl acetate, methoxypropanol, butanone and mixtures thereof.

11. A process comprising:
    (i) mixing a primer composition (a) comprising polymethyl methacrylate (a1), 1-methoxy-2-propanol and diacetone alcohol (a2), and dibenzoyl resorcinol (a3), and having a viscosity of >90 s measured in accordance with DIN EN ISO 2431 at 23° C. and with a 2 mm cup, with a solvent (b) such that a first mixture having a solids content of about 2 to 9.5 wt. % is obtained;
    (ii) mixing the first mixture with 0.01 to 15 wt. % of a compound (c) according to the general formula (I)

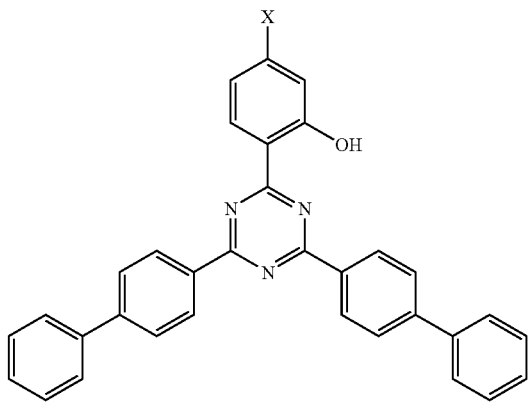

(I)

to form a second mixture; and
(iii) homogenizing the second mixture.

12. The process according to claim 11, wherein the first mixture has a solids content of 2.5 to 9 wt. %, and wherein the first mixture is mixed with 0.1% to 10 wt. % of the compound (c) according to the general formula (I).

13. The process according to claim 11, further comprising dissolving the compound (c) according to the general formula (I) in a component selected from the group consisting of diacetone alcohol, methoxypropanol and mixtures thereof, prior to mixing the compound (c) according to the general formula (I) with the first mixture.

14. A process comprising: (i) applying a second layer of a composition according to claim 1 to at least a portion of a first layer comprising a thermoplastic polymer; and (ii) curing the composition to form a multi-layer article.

15. The process according to claim 14, further comprising
    (iii) applying a top coat formulation to at least a portion of the second layer; and
    (iv) curing the top coat formulation.

16. The process according to claim 14, wherein applying the second layer comprises one or more selected from the group consisting of flow coating, dip coating, spraying, roll coating and spin coating.

17. The process according to claim 14, wherein curing the composition is carried out at a temperature of 20 to 200° C.

18. A multi-layer article prepared by the process according to claim 14.

19. A multi-layer article prepared by the process according to claim 15.

20. A layer assembly comprising
    i) a thermoplastic substrate on which
    ii) a primer layer is superimposed,
       characterized in that the primer layer is obtained by curing the composition according to claim 1.

21. The composition according to claim 1, wherein X is —$OR^6$, —$OCH_2CH_2OR^6$, or —$OCH_2CH(OH)CH_2OR^6$ and $R^6$ represents a branched or unbranched $C_1$-$C_{13}$ alkyl, $C_2$-$C_{20}$ alkenyl, or —CO—$C_1$-$C_{18}$ alkyl.

22. The composition according to claim 21, wherein X is —$OR^6$.

* * * * *